United States Patent
Vengerov

(10) Patent No.: US 8,468,041 B1
(45) Date of Patent: Jun. 18, 2013

(54) USING REINFORCEMENT LEARNING TO FACILITATE DYNAMIC RESOURCE ALLOCATION

(75) Inventor: David Vengerov, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1555 days.

(21) Appl. No.: 11/021,147

(22) Filed: Dec. 22, 2004

Related U.S. Application Data

(60) Provisional application No. 60/622,357, filed on Oct. 26, 2004.

(51) Int. Cl.
*G06Q 10/00* (2012.01)
(52) U.S. Cl.
USPC ........ 705/7.11; 705/7.22; 705/7.23; 718/104; 455/453; 700/291

(58) Field of Classification Search
None
See application file for complete search history.

(56) References Cited

U.S. PATENT DOCUMENTS

| | | | |
|---|---|---|---|
| 5,473,773 A * | 12/1995 | Aman et al. | 718/104 |
| 5,675,739 A * | 10/1997 | Eilert et al. | 709/226 |
| 6,985,872 B2 * | 1/2006 | Benbassat et al. | 705/7.14 |
| 7,023,979 B1 * | 4/2006 | Wu et al. | 379/265.11 |
| 7,395,252 B2 * | 7/2008 | Anderson et al. | 706/45 |
| 7,711,670 B2 * | 5/2010 | Roediger | 706/46 |
| 7,979,293 B2 * | 7/2011 | Reaume | 705/7.11 |
| 2001/0032029 A1 * | 10/2001 | Kauffman | 700/99 |
| 2002/0198926 A1 * | 12/2002 | Panter et al. | 709/106 |
| 2003/0014379 A1 * | 1/2003 | Saias et al. | 706/45 |
| 2003/0086514 A1 * | 5/2003 | Ginis et al. | 375/346 |
| 2003/0135399 A1 * | 7/2003 | Ahamparam et al. | 705/7 |
| 2003/0179717 A1 * | 9/2003 | Hobbs et al. | 370/254 |
| 2004/0073764 A1 * | 4/2004 | Andreasson | 711/170 |
| 2004/0098358 A1 * | 5/2004 | Roediger | 706/46 |
| 2004/0138897 A1 * | 7/2004 | Eapen | 705/1 |
| 2004/0230468 A1 * | 11/2004 | King et al. | 705/10 |
| 2005/0003824 A1 * | 1/2005 | Siris | 455/452.1 |
| 2005/0027577 A1 * | 2/2005 | Saeed | 705/8 |
| 2006/0080103 A1 * | 4/2006 | Van Breemen | 704/270 |

OTHER PUBLICATIONS

Zhu, Shenghuo (2003). Learning to cooperate. Ph.D. dissertation, The University of Rochester, United States—New York.*
Van Roy, Benjamin (1998). Learning and value function approximation in complex decision processes. Ph.D. dissertation, Massachusetts Institute of Technology, United States—Massachusetts.*
O'Rear, Holly Michelle (2002). Performance-based training evaluation in a high-tech company. Ph.D. dissertation, The University of Texas at Austin, United States—Texas.*

(Continued)

*Primary Examiner* — Gurkanwaljit Singh
(74) *Attorney, Agent, or Firm* — Park, Vaughan, Fleming & Dowler, LLP

(57) ABSTRACT

One embodiment of the present invention provides a system that allocates resources to projects in a computer system. During operation, the system determines a current demand by a project for a resource, and a current allocation of the resource to the project. The system also uses a computational model to compute an expected long-term utility of the project for the resource. Next, the system trades the resource between the project and other projects in the computer system to optimize expected long-term utilities. During this process, the system uses a reinforcement learning technique to update parameters of the computational model for the expected long-term utility of the project based on performance feedback.

21 Claims, 2 Drawing Sheets

OTHER PUBLICATIONS

Reinforcement Learning for Dynamic Channel Allocation in Cellular Telephone Systems (1997) by Satinder Singh, Dimitri Bertsekas In Advances in Neural Information Processing Systems: Proceedings of the 1996 Conference.*

Claus, Caroline; Boutilier, Craig. "The Dynamics of Reinforcement Learning in Cooperative Multiagent Systems". 1998. American Associatio for Artificial Intelligence.*

Chalkiadakis, Georgios.; Boutilier, Craig. "Coordination in Multiagent Reinforcement Learning: A Bayesian Approach". 2003, AAMAS '03.*

Bowling, Michael; Veloso, Manuela. "An Analysis of Stochastic Game Theory for Multiagent Reinforcement Learning". Oct. 2000. Vida.*

Littman, Michael L.; "Value-Function Reinforcement Learning in Markov Games". 2001. Journal of Cognitive Systems Research. pp. 55-66.*

Hamid R. Berenji and Sujit K. Saraf, Competition and Collaboration among Fuzzy Reinforcement Learning Agents, Fuzzy Systems Proceedings, 1998, IEEE World Congress on Computational Intelligence, The 1998 IEEE International Conference on Anchorage, May 4, 1998, pp. 622-627.*

Han, Zhu (2003) "An optimization theoretical framework for resource allocation over wireless networks" Ph.D. dissertation, University of Maryland, College Park, United States.*

* cited by examiner

USING REINFORCEMENT LEARNING TO FACILITATE DYNAMIC RESOURCE ALLOCATION

RELATED APPLICATION

This application hereby claims priority under 35 U.S.C. §119 to U.S. Provisional Patent Application No. 60/622,357 filed on 26 Oct. 2004, entitled "Reinforcement Learning Framework for Utility-Based Scheduling in Resource Constrained Systems," by inventor David Vengerov.

GOVERNMENT LICENSE RIGHTS

This invention was made with United States Government support under Contract No. NBCH020055 awarded by the Defense Advanced Research Projects Administration. The United States Government has certain rights in the invention.

BACKGROUND

The present invention relates to techniques for allocating resources in computer systems.

Computing facilities, such as data centers, often provide a pool of shared resources (for example, CPUs, memory space, bandwidth, storage space, and mobile servers) which can be shared between a number of clients (also referred to as "projects"). For example, assume that a number of projects are using such a facility simultaneously, and that resources can be dynamically reassigned among the projects, but only one project at a time can use a given resource. Also, assume that each project's resource requirements and available resources can be periodically evaluated so that reassignment decisions can be made.

Consider a simplified scenario wherein resources can be migrated instantaneously and at no cost. In this scenario, it is sufficient to migrate resources between projects in response to current (or recently observed) conditions if migration decisions can be initiated instantaneously (as soon as any load imbalance is observed) and if these decisions can be made infinitely often.

However, if the re-evaluations of system conditions are infrequent enough that a non-negligible amount of work can be done between the re-evaluation points, then a forward-looking resource re-assignment policy is preferable. That is, resources should ideally be migrated from project i to project/ only if the expected utility gain of project j during the next time interval outweighs the expected utility loss of project i during that interval.

Now consider a more-realistic scenario when resource migrations require a non-negligible time during which resources are idling (or are not fully utilized) or if there is some cost associated with resource migrations. In this case, resources should be migrated from project i to project j only if the expected long-term utility gain of project j outweighs the expected long-term utility loss of project i. That is, a poor resource allocation decision might require another reassignment at the very next decision point, thereby incurring another re-assignment cost. Also, the backlog of waiting jobs can significantly increase during the time interval when a poor resource allocation decision was made, and it might take many time steps to reduce this backlog.

Hence, when making resource allocation decisions, the system designer should consider not only the immediate benefit they will bring to the system during the next time interval, but also the long-term effects in terms of future migration costs and demand-resource match.

Note that a solution to the above problem can address many important problems, such as migrating CPUs or memory pages between resource pools, migrating servers among projects in a data center, reassigning I/O bandwidth among processes running on a processor module (or between sessions in an ATM, wireless, or TCP/IP network using end-to-end congestion control), and dynamically re-assigning memory space or disk space.

SUMMARY

One embodiment of the present invention provides a system that allocates resources to projects in a computer system. During operation, the system determines a current demand by a project for a resource, and a current allocation of the resource to the project. The system also uses a computational model to compute an expected long-term utility of the project for the resource. Next, the system trades the resource between the project and other projects in the computer system to optimize expected long-term utilities. During this process, the system uses a reinforcement learning technique to update parameters of the computational model for the expected long-term utility of the project based on performance feedback.

In a variation on this embodiment, the system operates in a distributed manner, wherein for each project the system: computes expected long-term utilities; trades resources with other projects; and uses the reinforcement learning technique to update its own copy of the computational model.

In a variation on this embodiment, the system operates in a centralized manner, wherein a centralized node: computes expected long-term utilities for each project; coordinates the trading of resources between projects; and uses the reinforcement learning technique to update the computational model.

In a variation on this embodiment, determining whether to trade the resource with another project involves considering the costs involved in migrating the resource to the other project.

In a variation on this embodiment, determining whether to migrate the resource from a project i to a project j involves determining whether the expected long-term utility gain of project j outweighs the long-term utility loss of project i.

In a variation on this embodiment, determining the current demand by the project for the resource involves considering changes in external demand for the resource.

In a variation on this embodiment, the resource can include: central processing units (CPUs); memory space; secondary storage space; servers; bandwidth; and/or I/O channels.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Multiprocessor System

Figure 1:
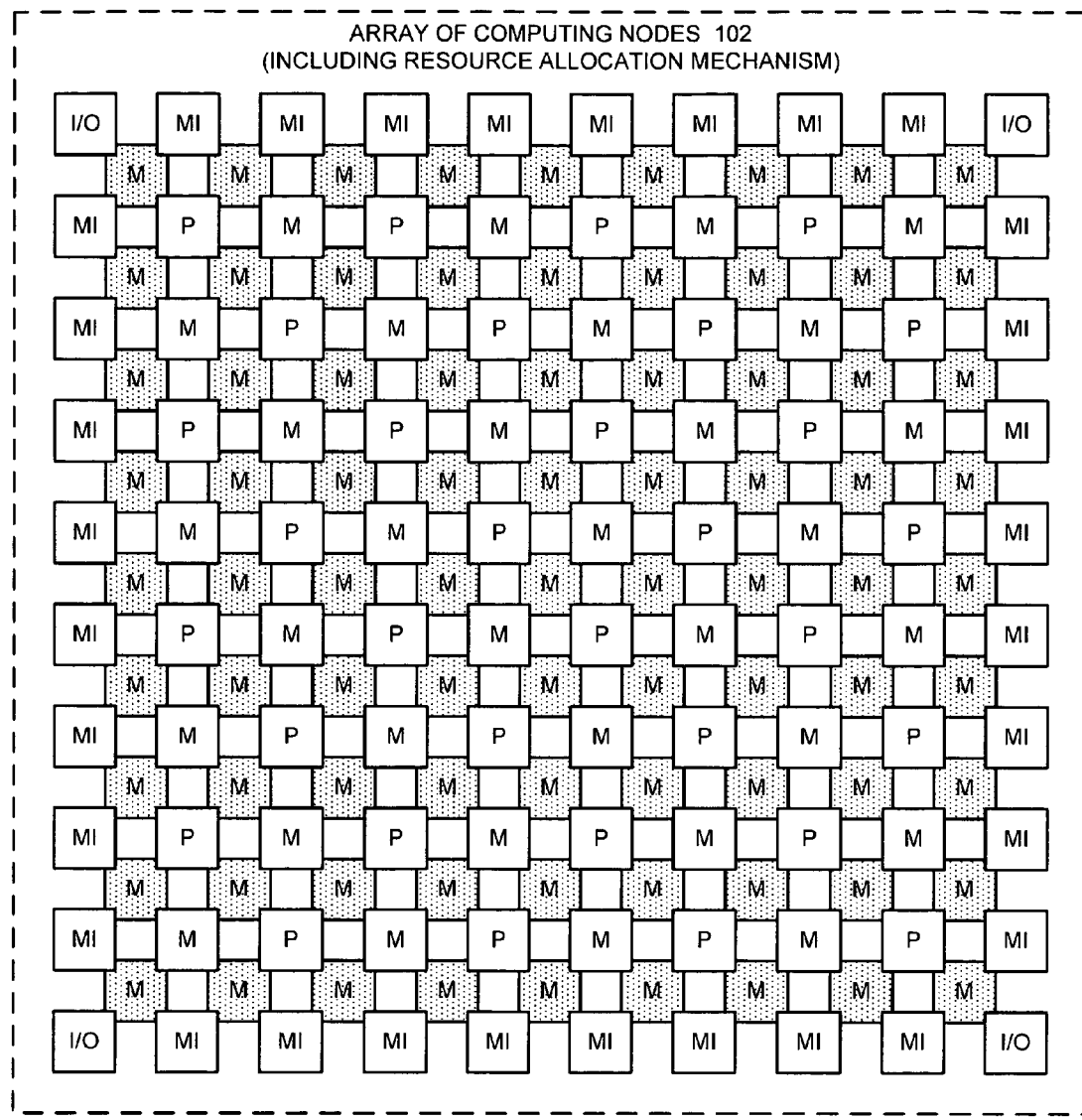
FIG. 1 illustrates a multiprocessor system which is organized as a grid in accordance with an embodiment of the present invention.

FIG. 1 illustrates a multiprocessor system which includes an array of computing nodes 102 in accordance with an embodiment of the present invention. Each node in the array can contain a processor and/or a memory.

For example, in the embodiment of the present invention illustrated in FIG. 1, the array of computing nodes 102 is comprised of a 19-by-19 grid of nodes, with 9 even-numbered rows containing only memory chips (9 in each row) and the 10 odd-numbered rows, which contain memory chips, CPUs or interface chips. Note that chips on the edge of the grid labeled MI support interface functions, while chips on the corners of the grid labeled I/O support I/O functions. In the embodiment of the present invention illustrated in FIG. 1, the array contains 32 CPUs and 113 memory chips. Moreover, each CPU provides hardware support for 8 execution strands.

For purposes of the present invention, the actual configuration of the multiprocessor system is not important; it does not have to be a regular grid. In general, any kind of interconnection scheme will work.

In the present invention, array of computing nodes 102 is associated with a resource allocation mechanism, which allocates resources, such as CPUs and memories between projects to optimize overall system performance. This resource allocation mechanism can be centralized so that it resides within a special service processor supervising the system. Alternatively, the resource allocation mechanism can be distributed across projects, so that each project performs its own resource allocation computations to determine whether to migrate any resources to and from other projects.

Although the present invention is described in the context of the multiprocessor system illustrated in FIG. 1, the present invention is not meant to be limited to such as system. In general, the present invention can be applied to any computer system which allocates computational resources between clients (projects). For example, the present invention can also be applied to a distributed computing system comprised of multiple processors located on different computer systems.

Resource Allocation Process

The resource allocation process described below operates in a system that allows a number of projects to operate simultaneously. In this system, resources can be dynamically reassigned among the projects, but only one project at a time can use a given resource. Furthermore, the system can determine each project's resource requirements and available resources at regular time intervals, so that reassignment decisions can be made.

We now describe a simple market-based approach to allocating resources and we then describe a more sophisticated market-based approach.

Simple Market-based Approach

Let $r_i$ be the amount of resources currently allocated to project i and $u_i$ be its current resource utilization/job backlog. Let $U_i(r_i,u_i)$ for project i be the expected average utility per unit of time received in the future by that project starting from its current state $(r_i,u_i)$. Consider a multi-agent architecture wherein an agent is assigned to managing resources of each project. The goal of each agent is to learn a functional mapping between $(r_i,u_i)$ and $U_i$, which can be accomplished using the reinforcement learning (RL) methodology. More specifically, each agent can use a parameterized function approximation architecture (e.g. a fuzzy rule base, a neural network, etc.) to represent $U_i(r_i,u_i)$, and RL can be used to tune the parameters of this architecture based on the performance feedback observed from the system. (For a description of reinforcement learning techniques, please refer to R. S. Sutton and A. G. Barto, *Reinforcement Learning An Introduction*. MIT Press, 1998.)

If the function approximation architectures employed by each agent represent differentiable utility functions, then resources can be allocated among the agents at every time step using a centralized mathematical programming algorithm. However, this approach is not scaleable to a large number of agents.

As an alternative to this centralized approach, a distributed game-theoretic approach can be used, wherein each agent carries out its own computations. For example, the following market-based trading approach can be iterated a number of times at every time step: each agent i computes the change in $U_i$ if a unit of resources is added or removed, and resources are then taken away from the least needy agent and given to the most needy one as long as the combined benefit of the two agents outweighs the cost of resource transfer. More specifically, a unit of resources is transferred from agent i to agent j if $$U_j(r_j+1,u'_j)-U_j(r_j,u_j)>U_i(r_i,u_i)-U_i(r_i-1,u'_i)+c$$

where $u'_j$ and $u'_i$ are resource utilizations that would result for agents j and i after the transfer and c is the cost of the resource transfer. Several resource units can be transferred during a single time step by re-computing the agent utilities and making sure that the above inequality continues to be satisfied.

If agent utility functions are concave increasing (each additional unit of resources bring at most as much benefit as the previous one), then the market-based resource trading approach described above converges to the globally optimal resource allocation that maximizes at every time step the sum of utilities of all agents. As an outline of the proof, observe that the trading of an infinitely divisible resource stops when $dU_i/dr_i=dU_j/dr_j$ for all i and j—when the marginal benefits of slightly increasing the resource holdings are the same for all agents. This is exactly the necessary condition for global optimality, which can be derived using the method of Lagrange multipliers. This condition is also sufficient for concave increasing utility functions and convex resource constraints such as having a fixed total amount of resources.

If the utility functions $U_i(r_i, u_i)$ are learned while resources are being migrated at every time step based on the current utility approximations, then the resulting framework becomes an instance of approximate policy iteration. (See D. Bertsekas and J. Tsitsiklis, *Neuro-Dynamic Programming*, Athena Scientific, 1996.) While this approach is simple to implement, it does not have the theoretical convergence guarantees. However, this approach can still be used beneficially if the optimal policy is not required and a good approximation to it can suffice.

A More-Sophisticated Market-Based Approach

A more sophisticated market-based approach can use an Actor-Only or an Actor-Critic RL approach for each individual agent (see [Baxter] Jonathan Baxter and Peter L. Bartlett. "Reinforcement learning in POMDP's via direct gradient ascent." In Proceedings of the Seventeenth International Conference on Machine Learning, 2000. Also see [Konda] V. R. Konda and J. N. Tsitsiklis, "Actor-Critic Algorithms," *SIAM Journal on Control and Optimization*, Vol. 42, No. 4, 2003, pp. 1143-1166.)

These approaches rely on learning a stochastic policy that maps the state $(r_t, u_t)$ into a probability distribution (or density) over the action space. A special policy (which can be interpreted as a part of the state transition function) can then map the action pair $(a_i, a_j)$ for agents i and j into a probability distribution (or density) over the possible resource transfers between the two agents.

In a setup where a single agent either borrows some resources from a fixed-size resource pool or gives up some resources back to the pool based on its action a, the RL-based tuning of the stochastic policy used by the agent is guaranteed to converge to optimal parameter values if the policy structure is chosen appropriately (see [Baxter] or [Konda] for the exact mathematical conditions for each type of RL algorithm). However, in a multi-agent setup (which is the one we are interested in) the state transition function depends on the action chosen by the other agent, and since the action distribution of other agents evolves over time as they keep learning, the formal mathematical structure of the Markov Decision Process does not hold. Instead, the multi-agent setup is described by a stochastic game formulation (see [Vengerov] D. Vengerov, *Multi-Agent Learning and Coordination Algorithms for Distributed Dynamic Resource Allocation*, Ph.D. Dissertation, Department of Management Science and Engineering, Stanford University, March 2004.) So far no theory has been developed about convergence of RL algorithms in stochastic games. The only relevant result is that IF the learning of each agent converges to some policy, then the set of these policies for all agents forms a Nash equilibrium of the game. There is also some experimental evidence [Vengerov] that if agents use the same RL algorithm of the type described in [Konda] (or equivalently in [Baxter]), then the learning of each agent converge to a policy that performs significantly better than the original one.

Summary of the Resource Allocation Process

Figure 2:
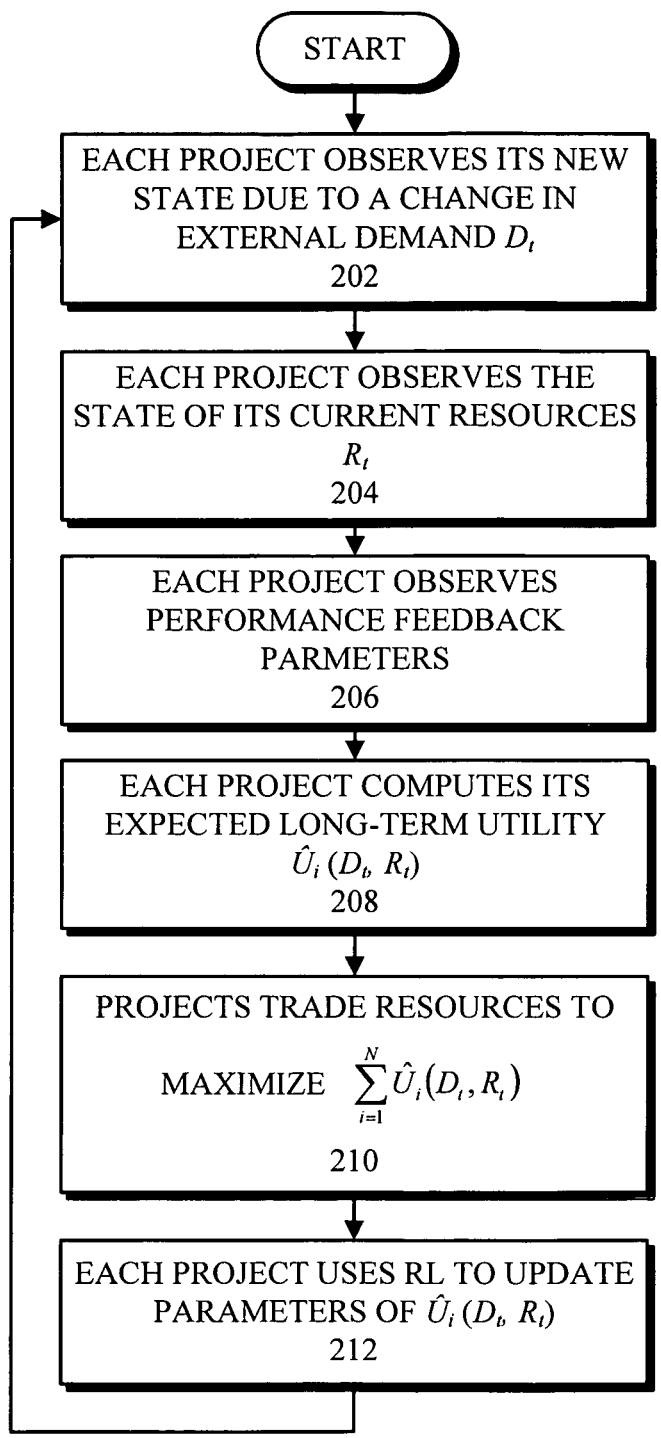
FIG. 2 presents a flow chart illustrating the resource allocation process in accordance with an embodiment of the present invention.

FIG. 2 presents a flow chart illustrating the resource allocation process in accordance with an embodiment of the present invention. During operation, the each project observes its new state D, due to changes in external demand (step 202). Each project also observes the state of its current resources R, (step 204). For example, these resources can include: central processing units (CPUs); memory space; secondary storage space; servers; bandwidth; and/or I/O channels.

In addition to these parameters, each project observes performance feedback parameters (step 206). These performance feedback parameters can include parameters such as system throughput and can be expressed as a reward.

Next, each project uses a model to compute its expected long-term utility $\hat{U}_i(D_t, R_t)$ for the resource (step 208). Note that this model approximates the project's actual expected long-term utility for the resource. Also note that this model contains a number of parameters, which can be adjusted to allow the model to more-accurately approximate the actual expected long-term utility for the resource.

The projects then trade resources to maximize some measure of the common benefit of all projects, such as the summation of the project utilities $$\sum_{i=1}^{N} \hat{U}_i(D_t, R_t)$$

(step 210). A weighted sum or a product of individual utilities can also be used.

Finally, the each project uses a reinforcement learning technique to update parameters of its model for its expected long-term utility $\hat{U}_i(D_t, R_t)$ (step 212).

The system then returns to step 202 to repeat the process. By repeating these steps, resources are continually reallocated and model parameters are continually updated as the system operates.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for allocating resources to projects in a computer system, comprising:
    in a resource allocation mechanism in the computer system,
        for each project, at least one processor of the computer system performing operations for:
            determining a current demand by the project for a resource;
            determining a current allocation of the resource to the project;
            using a computational model for the project to compute an expected long-term utility of the project for the resource; and
            using a reinforcement learning technique to update parameters of the computational model for the project based on performance feedback parameters; and
        trading the resource between the projects in the computer system to optimize a weighted summation of the computed expected long-term utilities of all the projects, wherein the weighted summation of the computed expected long-term utilities is a measure of a single common benefit of all the projects.

2. The method of claim 1, wherein each project includes a portion of the resource allocation mechanism, and wherein at least a portion of the method is performed separately by each project using a corresponding portion of the resource allocation mechanism.

3. The method of claim 1, wherein the method is performed by a centralized node in the computer system.

4. The method of claim 1, wherein determining whether to trade the resource with another project involves considering the costs involved in migrating the resource to the other project.

5. The method of claim 1, wherein determining whether to migrate the resource from a project i to a project j involves determining whether the expected long-term utility gain of project j outweighs the long-term utility loss of project i.

6. The method of claim 1, wherein determining the current demand by the project for the resource involves considering changes in external demand for the resource.

7. The method of claim 1, wherein the resource includes at least one of:
- central processing units (CPUs);
- memory space;
- secondary storage space;
- servers;
- bandwidth; and
- I/O channels.

8. A non-transitory computer-readable storage medium storing instructions that when executed by a computer cause the computer to perform a method for allocating resources to projects in a computer system, the method comprising:
for each project:
- determining a current demand by the project for a resource;
- determining a current allocation of the resource to the project;
- using a computational model for the project to compute an expected long-term utility of the project for the resource; and
- using a reinforcement learning technique to update parameters of the computational model for the project based on performance feedback parameters; and trading the resource between the projects in the computer system to optimize a weighted summation of the computed expected long-term utilities of all the projects, wherein the weighted summation of the computed expected long-term utilities is a measure of a single common benefit of all projects.

9. The computer-readable storage medium of claim 8, wherein each project includes a portion of the resource allocation mechanism, and wherein at least a portion of the method is performed separately by each project using a corresponding portion of the resource allocation mechanism.

10. The computer-readable storage medium of claim 8, wherein the method is performed by a centralized node in the computer system.

11. The computer-readable storage medium of claim 8, wherein determining whether to trade the resource with another project involves considering the costs involved in migrating the resource to the other project.

12. The computer-readable storage medium of claim 8, wherein determining whether to migrate the resource from a project i to a project j involves determining whether the expected long-term utility gain of project j outweighs the long-term utility loss of project i.

13. The computer-readable storage medium of claim 8, wherein determining the current demand by the project for the resource involves considering changes in external demand for the resource.

14. The computer-readable storage medium of claim 8, wherein the resource includes at least one of:
- central processing units (CPUs);
- memory space;
- secondary storage space;
- servers;
- bandwidth; and
- I/O channels.

15. An apparatus that allocates resources to projects in a computer system, comprising:
at least one processor, wherein the at least one processor comprises:
a utility computing mechanism which is configured to, for each project:
- determine a current demand by the project for a resource,
- determine a current allocation of the resource to the project, and to
- use a computational model for the project to compute an expected long-term utility of the project for the resource;

a trading mechanism configured to trade the resource between the projects in the computer system to optimize a weighted summation of the computed expected long-term utilities of all the projects, wherein the weighted summation of the computed expected long-term utilities is a measure of a single common benefit of all projects; and a learning mechanism configured to, for each project, use a reinforcement learning technique to update parameters of the computational model for the project based on performance feedback parameters.

16. The apparatus of claim 15, wherein the apparatus is distributed across multiple nodes in the computer system, and wherein the multiple nodes are configured to perform the determining, using, trading, and learning operations for each project.

17. The apparatus of claim 15, wherein the apparatus is located at a centralized node in the computer system.

18. The apparatus of claim 15, wherein while determining whether to trade the resource with another project, the trading mechanism is configured to consider the costs involved in migrating the resource to the other project.

19. The apparatus of claim 15, wherein while determining whether to migrate the resource from a project i to a project j, the trading mechanism is configured to determine whether the expected long-term utility gain of project j outweighs the long-term utility loss of project i.

20. The apparatus of claim 15, wherein while determining the current demand by the project for the resource, the utility computing mechanism is configured to consider changes in external demand for the resource.

21. The apparatus of claim 15, wherein the resource includes at least one of:
- central processing units (CPUs);
- memory space;
- secondary storage space;
- servers;
- bandwidth; and
- I/O channels.

* * * * *